J. ROEDEL.
BEARING.
APPLICATION FILED JUNE 2, 1913.

1,271,225.

Patented July 2, 1918.
2 SHEETS—SHEET 2.

Witnesses
Arthur W. Carlson
R. H. Van Nest

Inventor
John Roedel,
Edwin B. H. Tower Jr.
Atty

UNITED STATES PATENT OFFICE.

JOHN ROEDEL, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

BEARING.

1,271,225.          Specification of Letters Patent.         Patented July 2, 1918.

Application filed June 2, 1913. Serial No. 771,144.

*To all whom it may concern:*

Be it known that I, JOHN ROEDEL, a citizen of the United States, residing at Niagara Falls, in the county of Niagara and State of New York, have invented new and useful Improvements in Bearings, of which the following is a full, clear, concise, and exact description, reference being had to the accompanying drawing, forming a part of this specification.

This invention relates to improvements in generator construction.

The invention relates more particularly to means for mounting the armature shaft of a generator. In generator constructions heretofore employed, many difficulties have been encountered in attempting to provide ball bearings for the armature shaft. The standard types of ball bearings in common use comprise an inner and outer steel race between which a series of balls are held in place by a cage or retainer. In order to provide an accurate bearing, it is necessary that the inner race should be a press fit on the shaft, while the outer race may have a loose or floating fit in the bearing head or housing. It is a difficult and expensive operation to provide a proper force-fit between the ball race and the shaft on which it is mounted. Moreover, when such a fit has been accurately accomplished it is exceedingly difficult to remove the bearing from the shaft when it becomes necessary to dismantle the generator for repairs. This difficulty becomes especially important in the case of car lighting generators as repairs are generally necessary on the road or in smaller railroad shops where proper tools and facilities are not available.

An object of the present invention is to provide a ball bearing generator of simplified construction.

Another object is to provide a ball bearing generator which may be readily assembled and easily dismantled for repairs.

Another object of the invention is to provide for easily and accurately assembling ball bearings on a shaft.

Another object is to provide a ball bearing mounting which may be readily removed from the shaft on which it is assembled.

One embodiment of the invention is illustrated in the accompanying drawings, in which.

Figure 1:
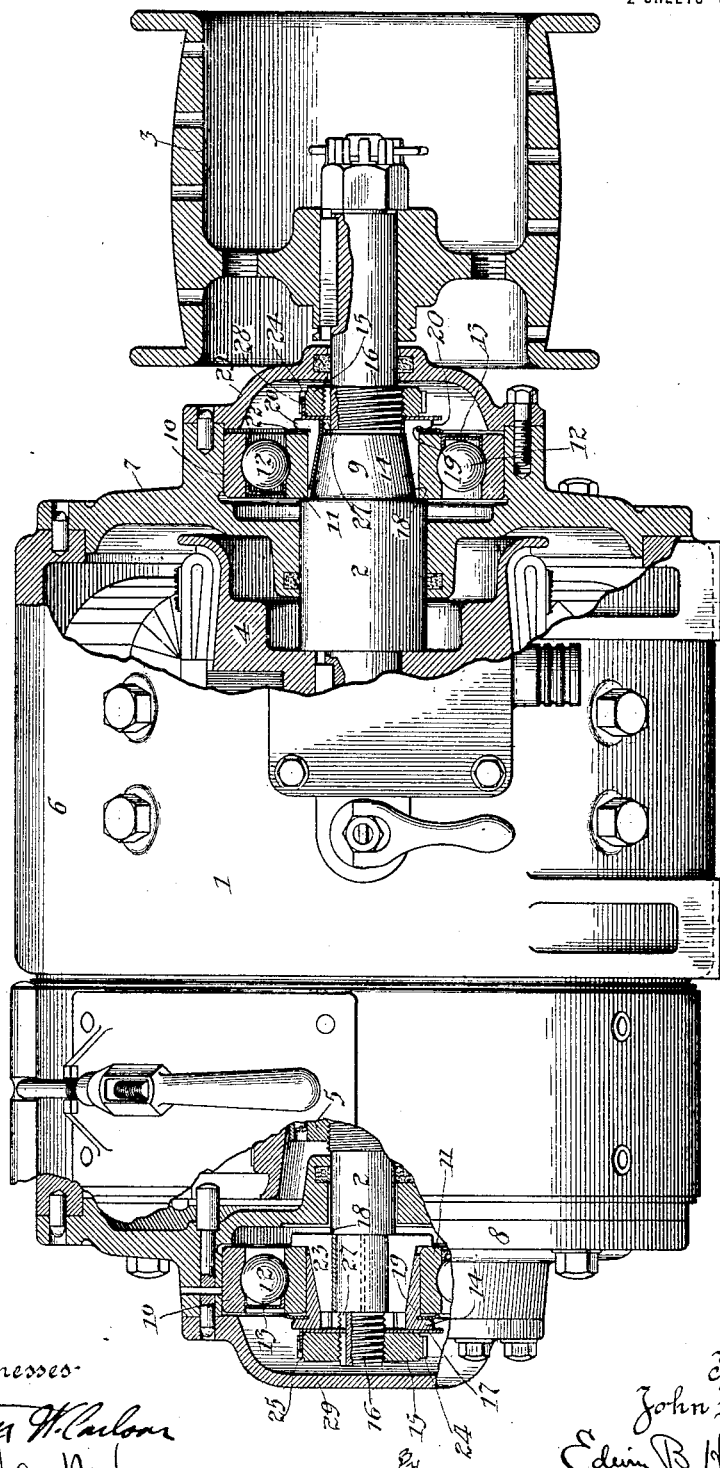
Figure 1 illustrates an elevation of a generator, portions being broken away to illustrate the shaft bearings.

Fig. 1 illustrates a standard generator 1, such as is employed in axle-driven equipments for car lighting systems. This generator has an armature shaft 2 which carries at one end a removable driving pulley 3. The armature 4 is centrally mounted on the shaft and keyed to rotate therewith. The opposite end of the shaft carries the commutator 5. A generator casing 6 provided with end heads 7 and 8 incloses all of the generator parts except the pulley.

The armature shaft turns in bearings provided between the pulley and armature at one end and outside of the commutator at the other end. The pulley end of the shaft is provided with a tapered portion 9 which is utilized in assembling the ball bearings as hereinafter described. The commutator end of the shaft must be somewhat reduced in order to be readily slipped through the armature spider which carries the armature and commutator.

The ball bearings for the ends of the shaft are similar and each has an outer race 10 and an inner race 11 of suitable hardened material between which the balls 12 are held by suitable retaining means 13.

Figure 2:
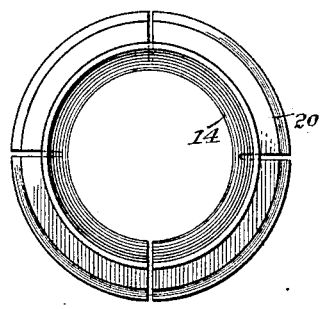
Figs. 2 and 3 are, respectively an end and side view of a split sleeve employed in assembling the bearings on the armature shaft.
Figure 3:
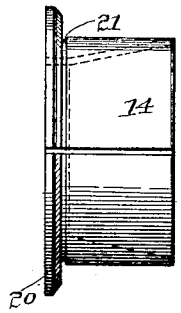

In assembling the ball bearing on the pulley end of the shaft, a split sleeve 14, shown in detail in Figs. 2 and 3, provided with a cylindrical outer surface and a conical inner surface, is provided. This sleeve, which is normally of slightly less diameter than the inside of the inner ball race, is placed within the race and the race and sleeve are slipped on to the tapered portion 9 of the shaft. A nut 15 is then screwed on to the threaded portion 16 of the shaft and is locked in position by a locking washer 17, shown in detail in Fig 6 and more fully described hereinafter. By means of this nut the sleeve is forced up the tapered portion of the shaft, which causes the sleeve to expand inside the ball race, resulting in as accurate a fit as though the race were forced on to a specially prepared seat with a press fit.

Figure 8:
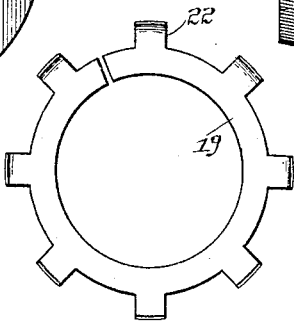
Figs. 8 and 9 are details of a resilient washer employed in assembling the bearing.
Figure 9:
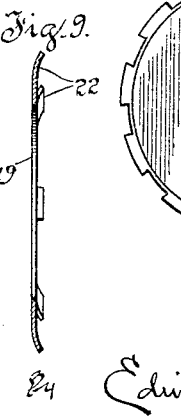

It is desirable in assembling the bearing that the inner race should not be locked in place until it has been properly positioned by abutting against the shoulder 18 at the inner end of the tapered portion 9. To insure this result, a split resilient washer 19, shown in detail in Figs. 8 and 9, is held in place against the flange 20 on the sleeve by being snapped into a recess 21 adjacent the flange. Resilient teeth 22 on the washer are bent to bear against the side of the ball race when the race is assembled on the sleeve. As the parts are driven to position by tightening the nut 15, the race is pressed ahead of the sleeve until it abuts firmly against the shoulder 18, whereupon the spring will yield to permit the sleeve to be forced into locking position.

Figure 4:
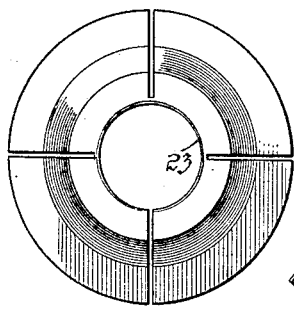
Figs. 4 and 5 are, respectively, an end and side view of a split conical sleeve employed on the commutator end of the armature shaft.
Figure 5:
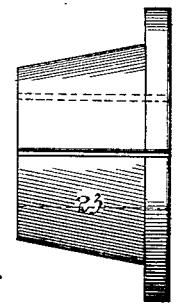

It is impractical to provide a tapered portion corresponding to the portion 9 on the commutator end of the shaft, as this end must be small enough to pass through the armature spider. In assembling the ball bearing on the commutator end of the shaft, an additional split sleeve 23, shown in detail in Figs. 4 and 5, is provided. This sleeve has a cylindrical central bore and a conical outer surface. The sleeve 23 is slipped on to the reduced portion of the shaft, thus providing a tapered portion which will receive a split sleeve 14 and ball bearing, which may be forced into position by means of a nut 15, as explained in connection with the pulley end of the shaft. As the sleeve 14 is forced on to the conical sleeve 23, the latter is compressed and the former expanded to form an accurate fit between the shaft and inner sleeve and between the outer sleeve and inner ball race.

On the commutator end of the shaft, the resilient washer 19 acts to force both the bearing race and the inner sleeve 23 to position before the wedging action becomes effective to lock the parts in place.

Figure 6:
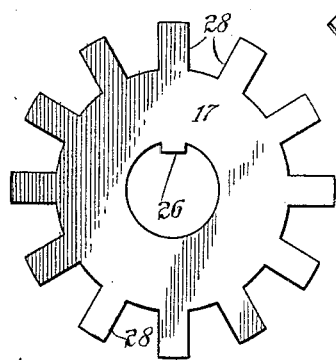
Figs. 6 and 7 illustrate, respectively, a locking washer and a nut with which it coöperates.
Figure 7:
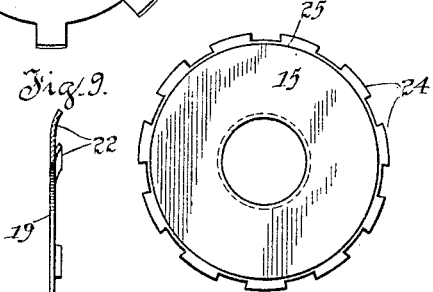

Figs. 6 and 7 illustrate details of the nuts 15 and locking washers 17, by means of which the nuts are readily locked in position. Each nut 15 is provided with a plurality of radial teeth 24 around its periphery. The nuts are preferably turned away at their edges, as indicated at 25, so that they may be driven to place by any convenient means, as a screw driver and hammer, and any burring that may be caused thereby will do no harm.

Fig. 6 illustrates the locking washer 17. Each washer has an internal key 26 fitting a key-way 27 in the armature shaft. The washers are preferably of pliable material and are provided with radial teeth 28 around their peripheries adapted to coöperate with the slots between the teeth on the nuts. There are preferably one or more teeth on the washers in excess of the slots on the nuts, so that with a very slight adjustment of the nuts one of the washer teeth may be bent over into a slot on the nut to securely lock the same in place.

By employing the improved bearing herein described, the necessity for the extremely fine and accurate machine work, heretofore employed to provide the accurate force-fit required between the shaft and ball race, is avoided. Fits closer than .002″ or .003″ are avoided as slight errors in machine work are readily taken up by the expansiveness of the split sleeves. Furthermore, although the expanding power of the split sleeve is very great and a very secure fit is provided, the bearings may be readily taken off without employing special machinery therefor. The taper of the surfaces is preferably such that as soon as the pressure of the nuts is relieved the parts will immediately come apart by the spring action of the sleeves. Should the parts tend to stick, they may be easily separated by forcing a screw driver behind the beveled flange 20 on the sleeve 14.

This means for mounting the ball bearings is especially advantageous in connection with a car lighting generator, not only on account of the facility with which the parts may be assembled or dismantled, but also on account of the simplified generator housing which may be employed. In constructions in which the ball bearings are fastened to the shaft by a press fit, it is necessary to make the inner portion of the generator heads separate from the outer portion. This complicated construction is rendered necessary as it is essential to remove the main portion of the head in order to get at the bearing to force it from the seat upon which it has been forced by a force-fit. With the improved construction a unitary generator head may be employed as the bearings may be readily removed by merely removing the oil cap 29.

It is apparent that many of the mechanical details and arrangements may be varied without departing from the scope of the invention which is defined in the appended claims.

What I claim as new and desire to secure by Letters Patent of the United States is:

1. In a generator provided with an armature shaft, said shaft having a reduced cylindrical end portion, a unitary split sleeve having a conical outer surface, and a cylindrical inner surface adapted to fit said reduced end, a second split sleeve having a cylindrical outer surface and a conical inner surface fitting said first sleeve, a ball race encircling said second sleeve, and means for forcing said second sleeve over said first sleeve, whereby one of said sleeves is contracted to closely fit said reduced end and the other sleeve is expanded to secure said ball race in position.

2. In combination, an armature shaft, a ball race loosely encircling said shaft, an expansible member between said shaft and race, and means for expanding said member to securely position said race on said shaft, said means including an expansible washer.

3. In combination, an armature shaft, a ball race loosely encircling said shaft, an expansible member between said shaft and said race, means for expanding said member to securely position said race on said shaft, and means for locking said expansible member in expanded position.

4. In combination, a tapered shaft, a split sleeve fitting said shaft, a ball race encircling said sleeve, a nut for forcing said sleeve on to the tapered shaft to expand said sleeve to secure said ball race in position, and means coöperating with said sleeve and ball race to force said ball race to position before the expanding action of said sleeve is effective to lock said parts.

5. In combination, an armature shaft, a ball race loosely encircling said shaft, an expansible member between said shaft and race, means for expanding said member to securely position said race on said shaft, and means coöperating with said expansible member to properly position said race before said securing means become effective.

6. In combination, a tapered member, a split sleeve fitting said member, a ball race encircling said sleeve, a resilient washer held in position on said sleeve and bearing against said ball race to force the same toward one end of said sleeve, and a nut for forcing said sleeve on to the tapered member to expand said sleeve to secure said ball race in position.

7. In combination, a shaft provided with a tapered portion, a unitary split sleeve having a cylindrical outer surface and a conical inner surface fitting said tapered portion, a ball race encircling said sleeve, said shaft being provided with a screw-threaded portion, and a nut on said screw-threaded portion for forcing said sleeve on to said tapered portion to expand said sleeve within said ball race.

8. In a generator having an inclosing casing and an end head, an armature shaft having associated therewith a part with a conical surface, a ball race housed within said end head and a unitary split sleeve having a cylindrical outer surface and a conical inner surface adapted to fit said first mentioned conical surface, said shaft being screw-threaded, and a nut on the screw-threaded portion of said shaft for forcing said split sleeve longitudinally to expand same within said ball race, whereby the construction of said end head may be simplified.

9. In combination, an armature shaft, a ball race for a ball bearing encircling said shaft, a unitary expansible sleeve between said shaft and said race, said shaft being screw-threaded, a nut on the screw-threaded portion of said shaft for causing said sleeve to expand within said race and to grip said shaft, and means for locking said nut in position.

10. In combination, an armature shaft, a ball race encircling said shaft, a pair of unitary split sleeves between said race and said shaft, said shaft being screw-threaded, a nut on the screw-threaded portion of said shaft adapted to cause one of said sleeves to contract to grip said shaft and to cause the other sleeve to expand to secure said race in position.

In witness whereof, I have hereunto subscribed my name in the presence of two witnesses.

JOHN ROEDEL.

Witnesses:
Wm. A. Turbayne,
Jos. Bohn.

Copies of this patent may be obtained for five cents each, by addressing the "Commissioner of Patents, Washington, D. C."